United States Patent [19]

Schill

[11] 4,375,245

[45] Mar. 1, 1983

[54] SAWHORSE BRACKETS

[76] Inventor: John M. Schill, 208 Samuel St., Kitchener, Ontario, Canada, N2H 1R6

[21] Appl. No.: 223,879

[22] Filed: Jan. 9, 1981

[51] Int. Cl.[3] ........................ B27B 21/00; F16M 11/00

[52] U.S. Cl. .................................... 182/155; 182/182; 182/227

[58] Field of Search ........................ 182/155, 181–184, 182/224, 225, 226

[56] References Cited

U.S. PATENT DOCUMENTS

| | | | |
|---|---|---|---|
| 875,269 | 12/1907 | Inman | 182/181 |
| 2,174,952 | 10/1939 | Spiking | 182/155 |
| 2,376,787 | 5/1945 | Larson | 182/182 |
| 2,573,740 | 11/1951 | Spiking | 182/155 |
| 2,711,917 | 6/1955 | Blu | 182/185 |
| 3,269,487 | 8/1966 | Larson | 182/155 |
| 3,599,751 | 8/1971 | Mueller | 182/155 |
| 4,192,406 | 3/1980 | Mitchell | 182/185 |

FOREIGN PATENT DOCUMENTS

| | | | |
|---|---|---|---|
| 943464 | 12/1963 | United Kingdom | 182/155 |

*Primary Examiner*—Reinaldo P. Machado

*Attorney, Agent, or Firm*—Hirons, Rogers & Scott

[57] ABSTRACT

A new sawhorse bracket for use with a rectangular cross-section cross-bar, usually of wood, is formed preferably by stamping and subsequent bending from a continuous strip of metal, the bracket comprising a central portion of truncated isosceles triangle shape so as to have two inclined edges, leg supporting portions extending at right angles to the central portion, return portions extending at right angles to the leg-supporting portions, and end portions which engage the sides of the cross-bar. The bracket is fastened to the cross-bar by screws passing through the central portion and a single relatively heavy bolt passing through the end members and the cross-bar. The legs are pivoted to the inclined leg-supporting portions and therefore move from a splayed support position to a stored position alongside the cross-bar to be stable when erected but occupying minimum space when stored. An integral stop is provided for each leg and a gravity operated latch that locks automatically when the sawhorse is upright and unlocks automatically when the sawhorse is inverted. An additional support bar is provided pivotally mounted on two struts which can be supported at different heights in respective bores in the cross-bar.

10 Claims, 12 Drawing Figures

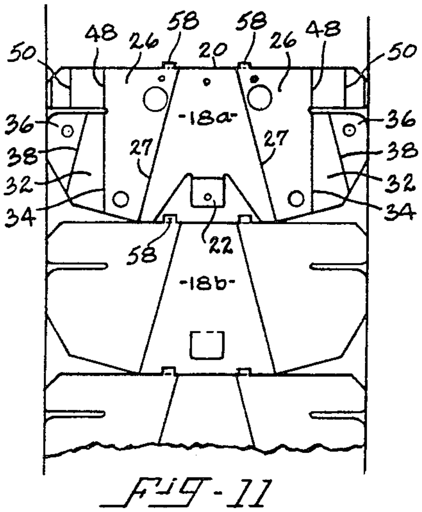
Fig-11
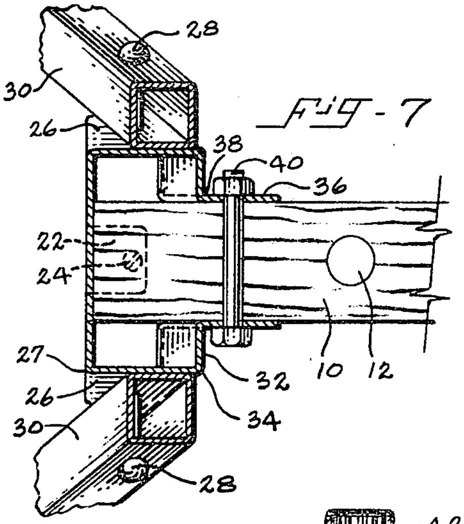
Fig-7
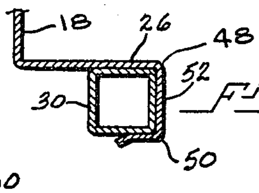
Fig-12
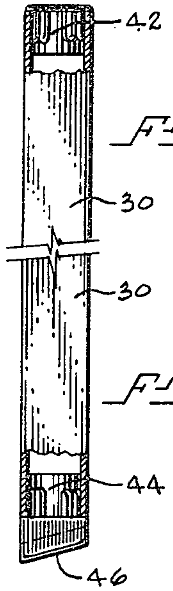
Fig-9
Fig-10
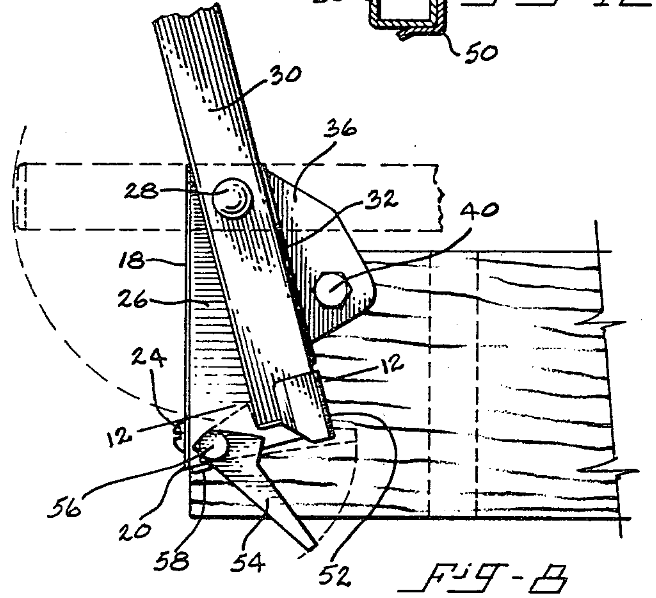
Fig-8

SAWHORSE BRACKETS

FIELD OF THE INVENTION

This invention is concerned with improvements in or relating to sawhorse bracket of the type with which a pair thereof are attached to a crossbar to form the sawhorse.

REVIEW OF THE PRIOR ART

A number of proposals have been made hitherto to provide sawhorse brackets that can be attached to a cross-bar, usually of wood, to form a sawhorse. The sawhorse has always been a common item in workshops and there is a continuing need for a foldable structure that will be stable when erected while occupying a minimum of space when stored. For the erected sawhorse to be stable it is virtually essential that its legs are splayed apart, and difficulty is experienced in folding such a structure to a minimum size. For example, if the legs pivot about a horizontal axis through the cross-bar then the splayed legs still occupy a considerable space when folded, while if they pivot about an axis parallel to the cross-bar the legs will still extend over a considerable space. An arrangement to pivot each leg about two axes becomes too expensive and difficult to keep stable when erected. In another much-used arrangement as the two legs at each end of the cross-bar are spread, the bracket clamps onto the cross-bar, which is of wood, but movement to fold the legs together disengages them from the cross bar, which is highly inconvenient.

DEFINITION OF THE INVENTION

It is therefore an object of the invention to provide a sawhorse bracket of the type specified that results in a lightweight, foldable sawhorse that is stable when erected and relatively compact when folded for storage.

In accordance with the present invention there is provided a sawhorse bracket for use with an elongated cross-bar of rectangular cross-section comprising;

a central end portion of truncated isosceles triangle shape to have corresponding opposite inclined edges;

two inclined leg-supporting portions each connected to a respective inclined edge so as to extend longitudinally of the cross-bar;

two return portions each connected to a respective leg-supporting portion so as to extend back toward the respective adjacent surface of the cross-bar when present;

two end portions each connected to a respective return portion and adapted for fastening to the cross-bar when present;

whereby each leg-supporting portion, return portion and the interposed parts of the end portion and the cross-bar when present form a hollow structural leg-support member; and two leg members each pivotally connected to a respective leg-supporting portion for movement between a splayed operative supporting position and a stored position in which it will extend alongside the cross-bar when present.

Preferably, the said centre end portion, the leg-supporting portions, the return portions and the end portions are all integral with one another formed by stamping from a flat sheet of metal.

DESCRIPTION OF THE DRAWINGS

Particular preferred embodiments of the invention will now be described, by way of example, with reference to the accompanying drawings wherein:

FIG. 8 is a view similar to FIG. 4 to illustrate the gravity operation of a leg latch upon inversion of the sawhorse, FIGS. 9 and 10 are side elevations respectively of the upper and lower ends of a leg with parts shown broken away to illustrate details thereof;

FIG. 11 is a plan view of a metal strip to show the manner in which the sawhorse brackets can be produced by progressive forming therefrom, and FIG. 12 is a cross-section in the line 12—12 of FIG. 8.

DESCRIPTION OF THE PREFERRED EMBODIMENTS

Figure 1:
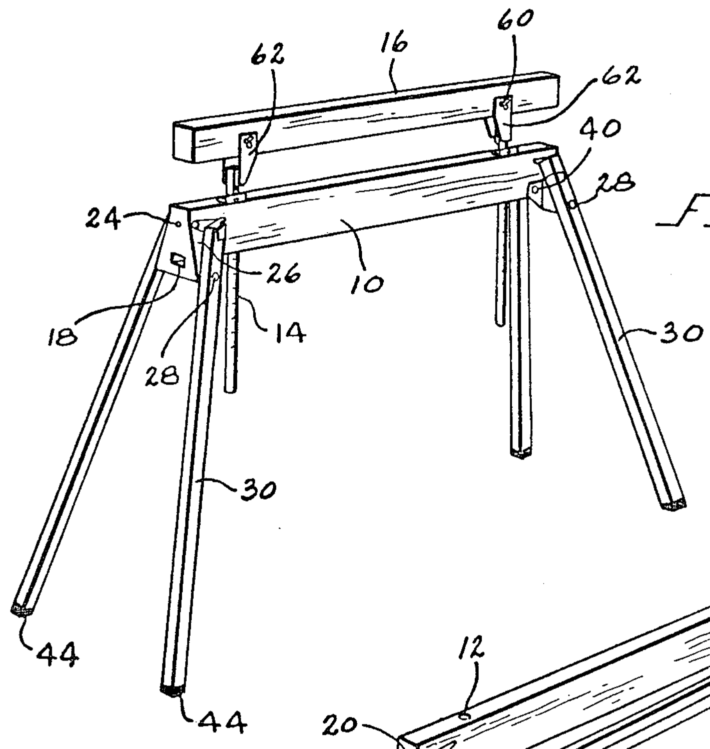
FIG. 1 is a perspective view of an erected sawhorse.

The sawhorse brackets of the invention are, as illustrated, normally employed in pairs fastened to the opposite ends of a rectangular-cross-section cross-peice 10, which usually is a piece of wood of the standard 5 cm by 10 cm (2×4 inch) cross-section. In its erected state as illustrated by FIG. 1, in addition to its standard intended use as a sawhorse, it can be used as a table trestle, utility stand, display stand, outboard motor stand, etc. In this particular embodiment the cross-piece is in addition provided with two spaced parallel vertically-extending bores 12 through which pass respective tubular support struts 14 of a support bar 16. With the support bar in position the structure can be used, for example, to support long workpieces that are being cut or drilled on an adjacent worktable. The support bar can also be tilted as will be described below so as to support an item thereon at an angle to the horizontal.

The two brackets are of identical construction and consist of a truncated isosceles triangle shaped central end portion 18 which abuts the cross-piece end face, the width of the truncated top edge 20 being just equal to the width of the cross-piece 10. A locating and fastening tab 22 is struck out of the portion 18 at right angles thereto and engages the lower horizontal face of the cross-piece. The bracket can therefore readily be placed and accurately located on the respective end of the cross-piece. The bracket is fastened to the cross-piece by screws 24 passing through respective apertures punched in the portion 18 and the locating tab 22.

Figure 2:
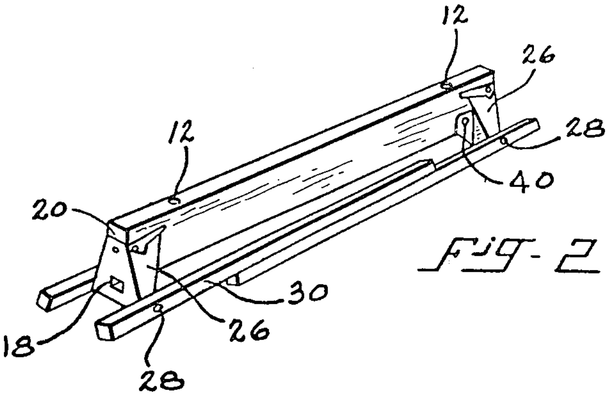
FIG. 2 is a similar view of the sawhorse of FIG. 1, with its legs in the stored position.
Figure 5:
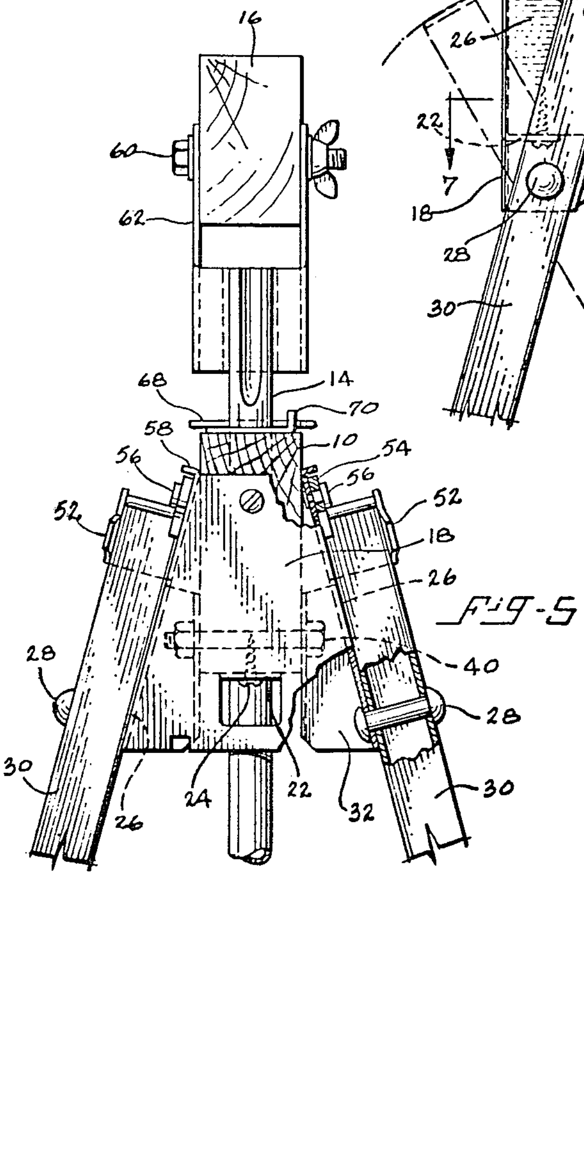
FIG. 5 is an end elevation to an enlarged scale of the sawhorse end of FIG. 4, FIGS. 6 and 7 are respective cross-sections taken on the lines 6—6 and 7—7 of FIG. 4.

The bracket also has two opposed leg-support portions 26 provided by folding the metal blank (FIG. 11) to form two right angle corners along the junctions 27 constituted by the respective symetrically-inwardly inclined edges of the central portion 18. Each inclined portion 26 has pivotally connected thereto, as by a heavy rivet 28, a respective bracket leg 30 which can be swung about the pivot rivet 28, from an extended splayed support position illustrated by FIGS. 1 and 5 to a folded stored position illustrated by FIG. 2. Because of the upward and inward inclination of the portions 26 the legs 30 are automatically splayed outwards to the required extent when in the support position while, because of the extension of these portions parallel to the longer face of the cross-piece 10, the legs are automatically positioned parallel to the length of the cross-piece 10, as illustrated by FIG. 2, when in the stored position.

Two opposed truncated triangular return portions 32 of the metal blank are folded in the same direction as the junctions 27 about respective right-angle junctions 34, and respective remaining end portions 36 of the blank are folded in the opposite direction about respective right angle junctions 38. The shape of the return portions 32 is such that the end portions 36 lie flat against the respective adjacent side walls of the cross-piece 10 and can be fastened securely thereto by a relatively heavy bolt 40 passing through respective preformed apertures in the end portions and the cross-piece. It will be seen that, as illustrated by FIG. 11, the brackets can be formed continuously from a steel strip by a progressive die stamping operation followed by a folding operation. This provides a structure that is exceptionally strong and rigid when fastened to its cooperating cross-piece since each leg 30 is in effect fastened by the pivot rivet 28 to a rigid hollow tubular structure constituted by the interposed part of the end portion 18, leg-support portion 26, return portion 32 and the interposed part of the cross-piece 10, the rigidity of this hollow structure being maintained by the relatively heavy bolt 20 in the strong and rigid cross-piece 10.

Figure 4:
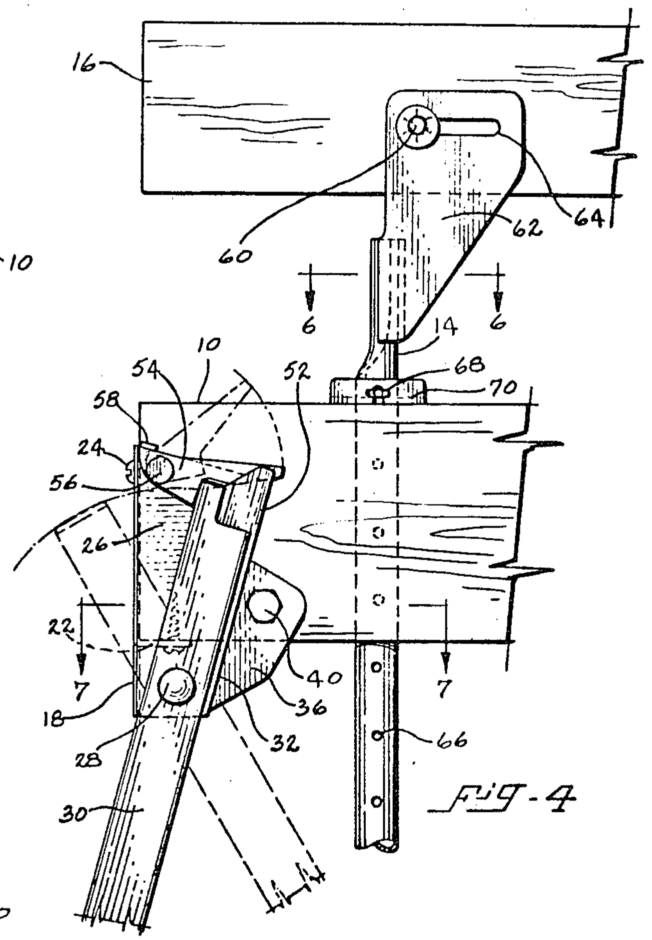
FIG. 4 is a side elevation to an enlarged scale of one end of the sawhorse.

In this embodiment each leg member 30 is a piece of hollow, square-cross-section tube provided at its top end with a plastic closure cap 42 (FIG. 9) and at its bottom end with a plastic foot 44 (FIG. 10), the latter having an appropriately-inclined floor-engaging face 46. Another two opposed portions of the blank attached to the leg-supporting portions 26 are folded about respective fold lines 48 and 50 to provide a U-shaped cradle-like stop member 52, into which the upper end of the leg fits snugly when in the support position to hold the leg firmly in that position. With the sawhorse upright each leg is locked in place automatically when moved to the support position by a gravity-operated latch 54 pivotally connected by a rivet 56 to the respective leg-supporting bracket portion 26. The latch blade is so shaped that, as it is engaged by the upper leg end moving from the stored position, it is moved to the position shown in broken lines in FIG. 4, and then drops by gravity automatically to the locking position shown in solid lines. If the sawhorse is inverted as shown in FIG. 8, then the latch blade drops automatically by gravity to the unlocking position shown therein in solid lines, permitting the legs to be folded. A stop member 58 is formed integrally with the bracket and prevents the latch blade from moving to an inoperative position.

Figure 3:
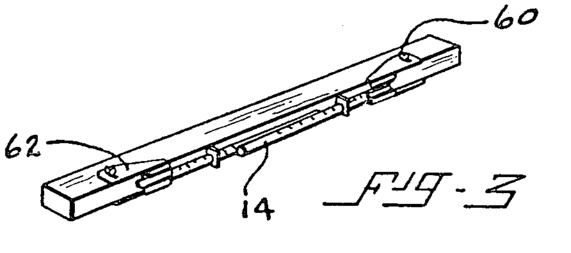
FIG. 3 is a similar view of a support bar for the sawhorse separated therefrom and with its support struts in the stored position.
Figure 6:
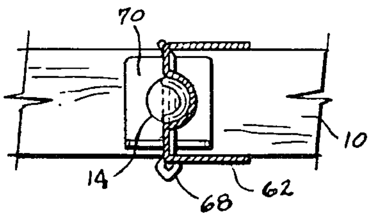

Referring now particularly to FIG. 3, in this embodiment the additional support bar 16 is connected at each end by a bolt 60 to a respective yoke member 62, the two arms of each yoke being provided with elongated holes 64 to permit tilting of the bar if its two ends are placed at different heights above the cross-piece 10, and also to permit the struts to be folded along the bar for storage as illustrated in FIG. 3. Each yoke is fastened to its respective strut 14, which is provided along its length with a series of spaced holes 66 for receiving a locking pin 68 passing through a bracket 70 surrounding the strut.

It will be seen therefore that I have provided a new bracket which can be made in quantity by punching and bending in a mass-production process, and will result in a strong, lightweight sawhorse and the like that will be adequately rigid and stable when erected and yet will fold to a relatively compact package for transport and storage. The method of positioning and retaining each leg in the erected position ensures that each leg is held firmly in contact with a rigid structure, preventing instability and leg wobble, without requiring spreader bars or other cross-bracing members.

I claim:

1. A sawhorse bracket for use with an elongated cross-bar of rectangular cross-section comprising:

a central end portion of truncated isosceles triangle shape to have corresponding opposite inclined edges;

two inclined leg-supporting portions each connected to a respective inclined edge so as to extend longitudinally of the cross-bar;

two return portions each connected to a respective leg-supporting portion so as to extend back toward the respective adjacent surface of the cross-bar when present;

two end portions each connected to a respective return portion and adapted for fastening to the cross-bar when present;

whereby each leg-supporting portion, return portion and the interposed parts of the end portion and the cross-bar when present form a hollow structural leg-support member; and two leg members each pivotally connected to a respective leg-supporting portion for movement between a splayed operative supporting position and a stored position in which it will extend alongside the cross-bar when present.

2. A sawhorse bracket as claimed in claim 1, wherein the said centre end portion, the leg-supporting portions, the return portions and the end portions are all integral with one another formed by stamping from a flat sheet of metal.

3. A sawhorse bracket as claimed in claim 1, wherein means for fastening the bracket to the cross-bar include a clamp bolt passing through the two end portions and through the interposed part of the cross-bar.

4. A sawhorse bracket as claimed in claim 2, wherein means for fastening the bracket to the cross-bar include a struck-out part of the centre portion for engagement with an under-surface of the cross-bar when present, and means for fastening the struck-out part of the cross-bar.

5. A sawhorse bracket as claimed in claim 1, wherein each leg member is of hollow square cross-section with a closure member at the top end and a foot member at the bottom end providing an inclined floor engaging surface.

6. A sawhorse bracket as claimed in claim 1, and having extending from each leg-supporting portion a respective U-shaped stop member engaged by the upper end of the respective leg-member in the said splayed supporting position to retain the leg member in that position.

7. A sawhorse bracket as claimed in claim 6, and including a latch member pivotally-connected to each respective leg-supporting portion to engage automatically by gravity the said upper end of the leg member and retain it in engagement with the stop member.

8. A sawhorse bracket as claimed in claim 7, wherein inversion of the bracket will automatically release the latch member by movement under gravity from the said upper end of the leg member.

9. A sawhorse bracket as claimed in claim 1, and having integral with each leg-supporting portion and extending therefrom a respective U-shaped stop member engaged by the upper end of the respective leg-member in the said splayed supporting position to retain the leg member in that position, the bracket also including a latch member pivotally-connected to each respective leg-supporting portion to engage automatically by gravity the said upper end of the leg member and retain it in engagement with the stop member.

10. A sawhorse bracket as claimed in claim 1, in combination with a support bar comprising an elongaged support bar member, two strut members each adapted to move in respective spaced vertical bores in the cross-bar, two yoke members each connected to a respective strut member and pivotally connected to the support bar member, and means for supporting each strut member in its respective bore at different positions along its length.

* * * * *